(12) United States Patent
Lennen

(10) Patent No.: US 6,266,007 B1
(45) Date of Patent: Jul. 24, 2001

(54) CODE GROUP DELAY CALIBRATION USING ERROR FREE REAL TIME CALIBRATION SIGNAL

(75) Inventor: Gary R. Lennen, Cupertino, CA (US)

(73) Assignee: Trimble Navigation LTD, Sunnyvale, CA (US)

( * ) Notice: Subject to any disclaimer, the term of this patent is extended or adjusted under 35 U.S.C. 154(b) by 0 days.

(21) Appl. No.: 09/668,784

(22) Filed: Sep. 22, 2000

Related U.S. Application Data

(63) Continuation of application No. 08/943,552, filed on Oct. 3, 1997, now abandoned.

(51) Int. Cl.[7] .............................. H04B 7/185; G01S 5/02
(52) U.S. Cl. ..................... 342/357.02; 342/174; 701/214
(58) Field of Search ............................. 342/174, 357.02; 701/214

(56) References Cited

U.S. PATENT DOCUMENTS

| | | | |
|---|---|---|---|
| 5,812,961 | * | 9/1998 | Enge et al. ............................ 701/207 |
| 5,973,643 | * | 10/1999 | Hawkes et al. ....................... 342/457 |

* cited by examiner

*Primary Examiner*—Theodore M. Blum
(74) *Attorney, Agent, or Firm*—Boris G. Tankhilevich

(57) ABSTRACT

The present invention discloses the apparatus and the method for calibrating a Narrow Band Receiver in real time for code group delay errors in the signals transmitted by a Narrow Band Transmitter. The apparatus includes a Calibration circuit used to generate a calibration signal that is substantially free from code delay errors, and that is substantially similar to the signal emanating from the Narrow band Transmitter. The calibration signal can be used by the Narrow Band receiver to measure and offset the group delay errors in real time.

37 Claims, 6 Drawing Sheets

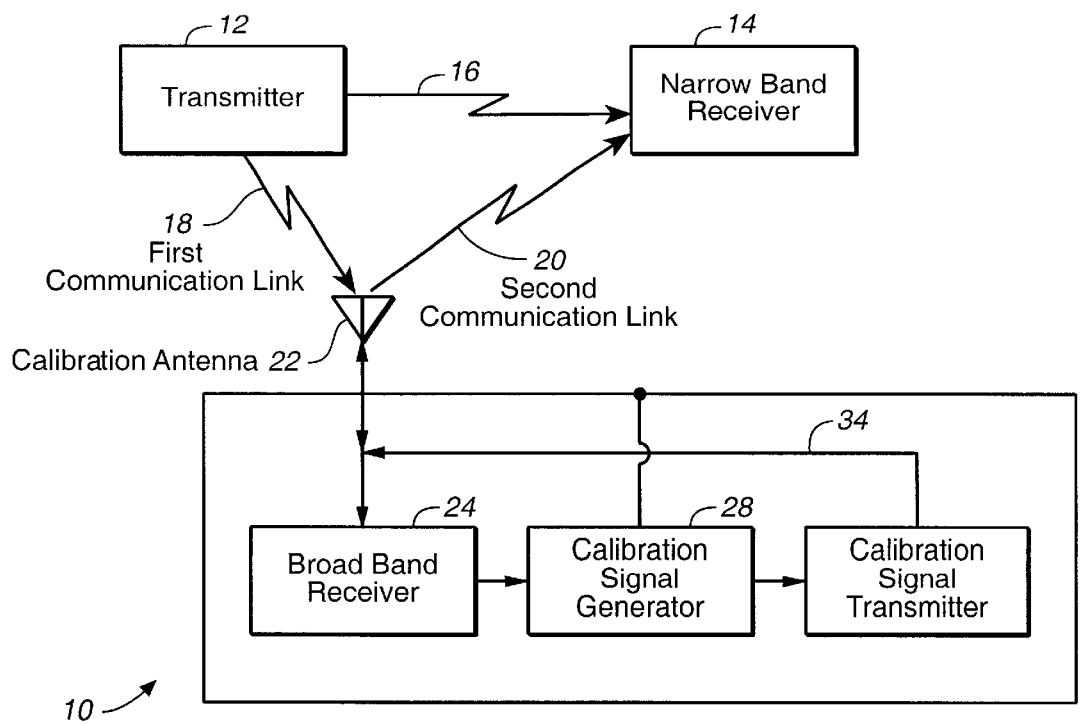
FIG._1
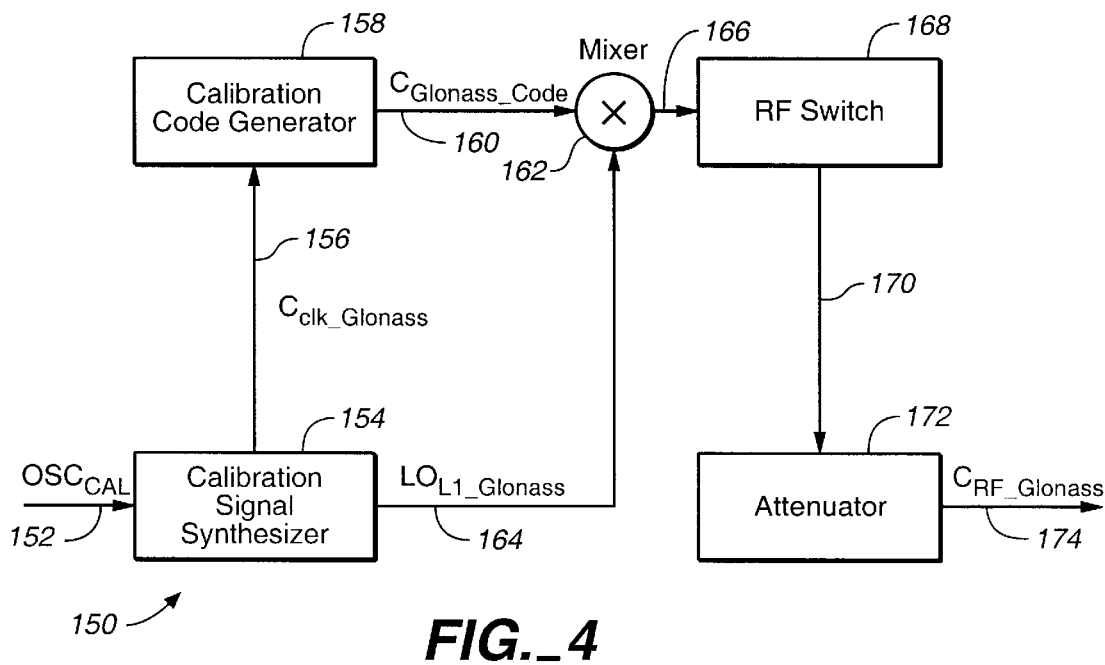
FIG._4

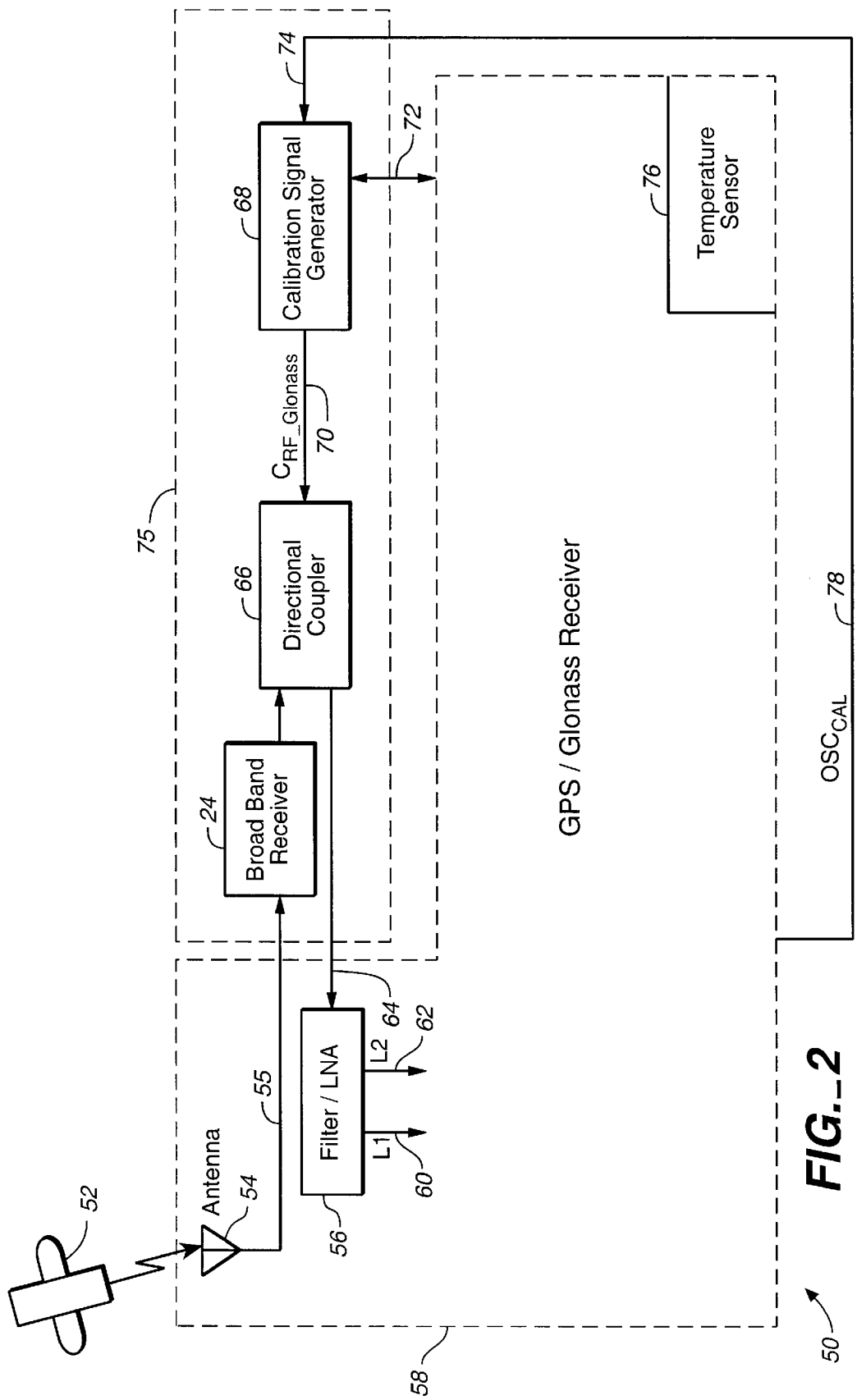
FIG._2

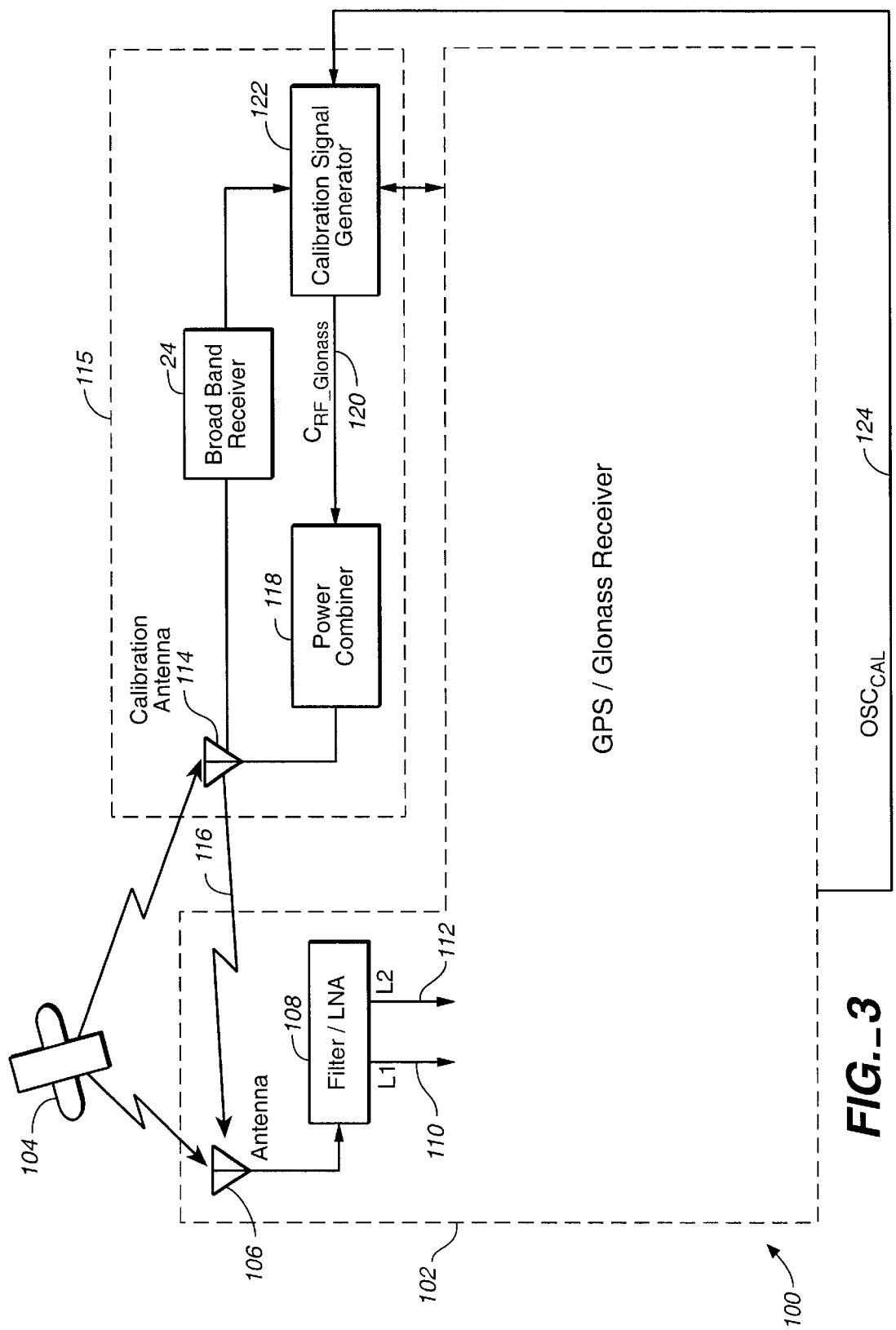
FIG._3

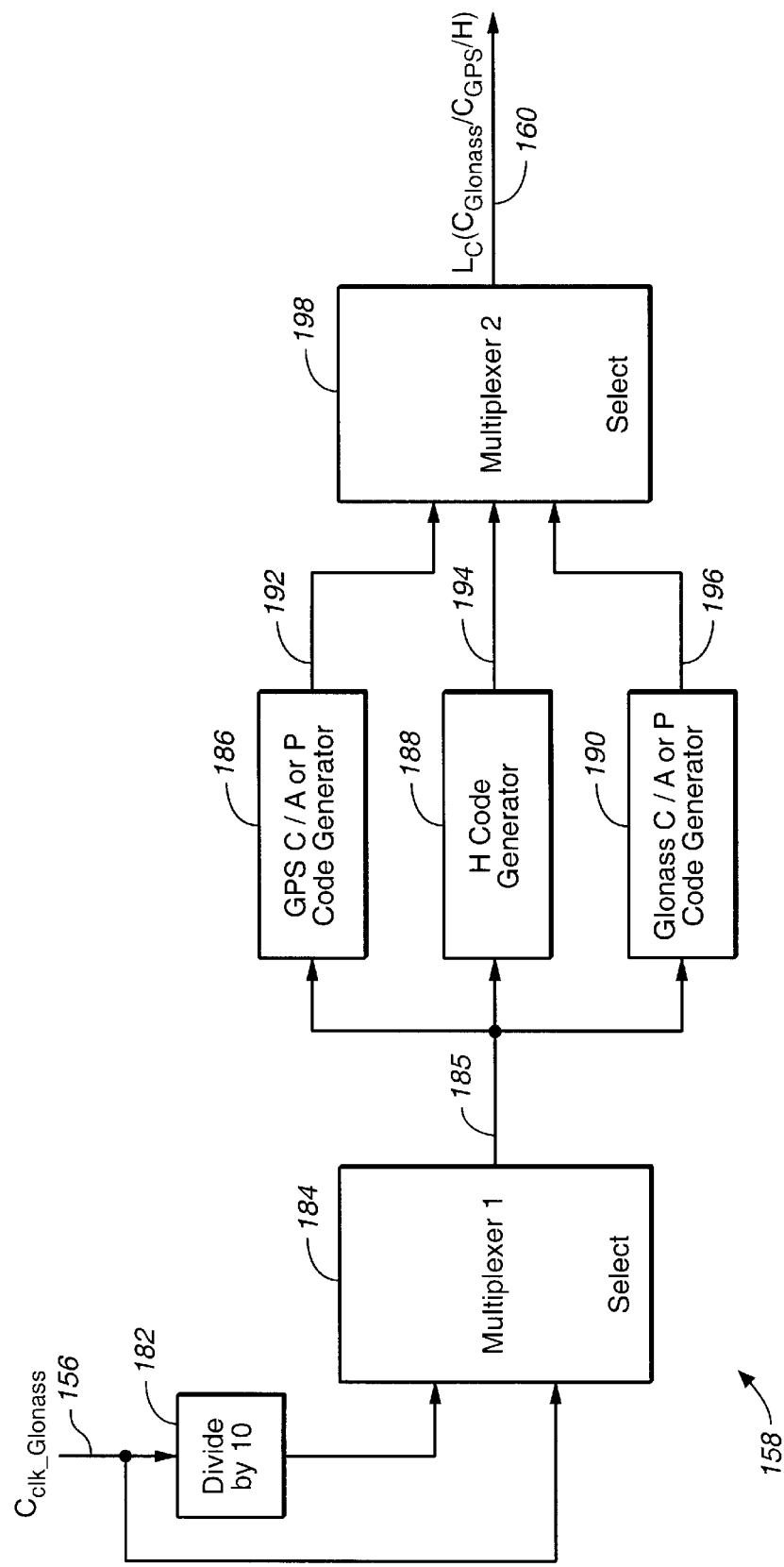
FIG._5

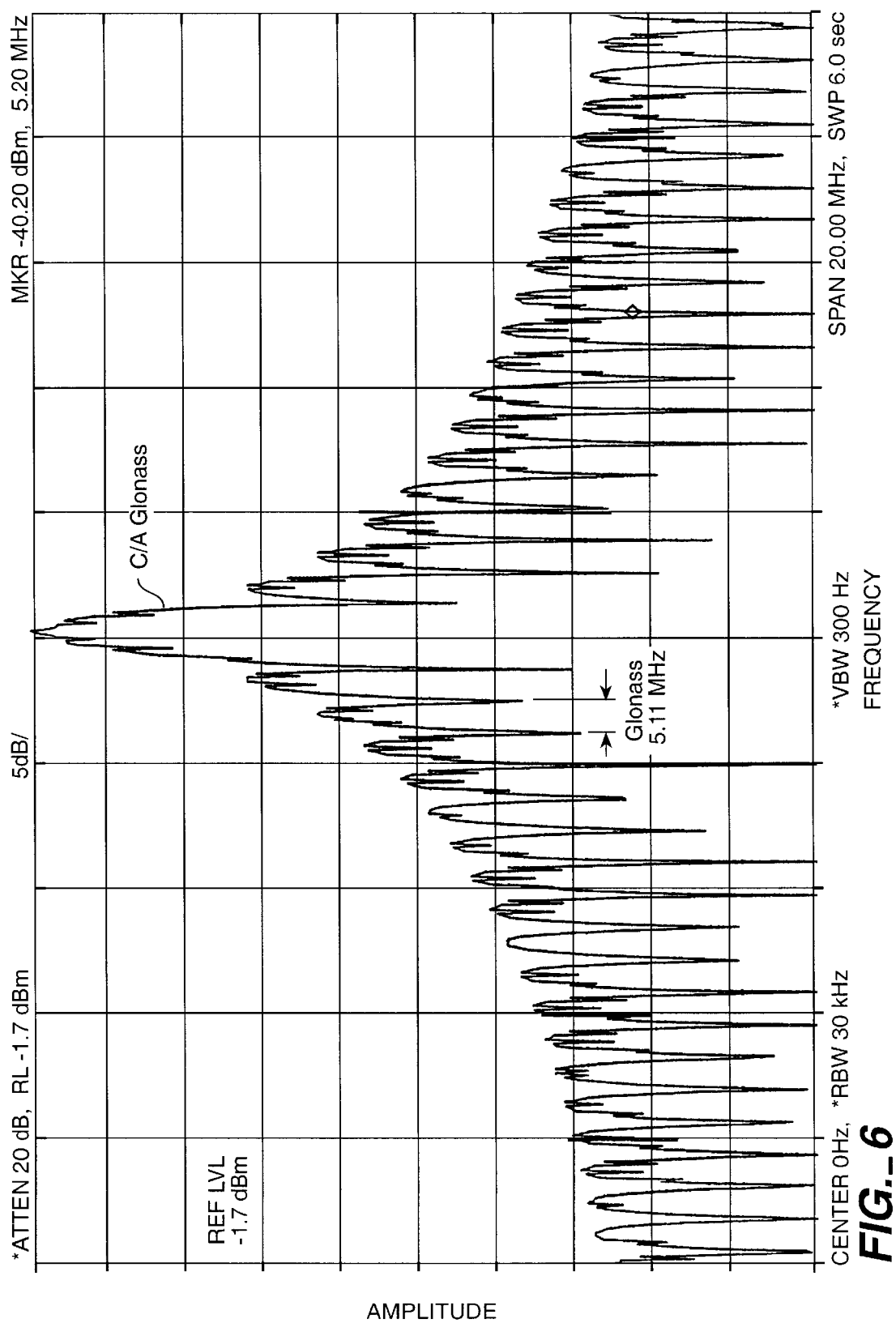
FIG._6

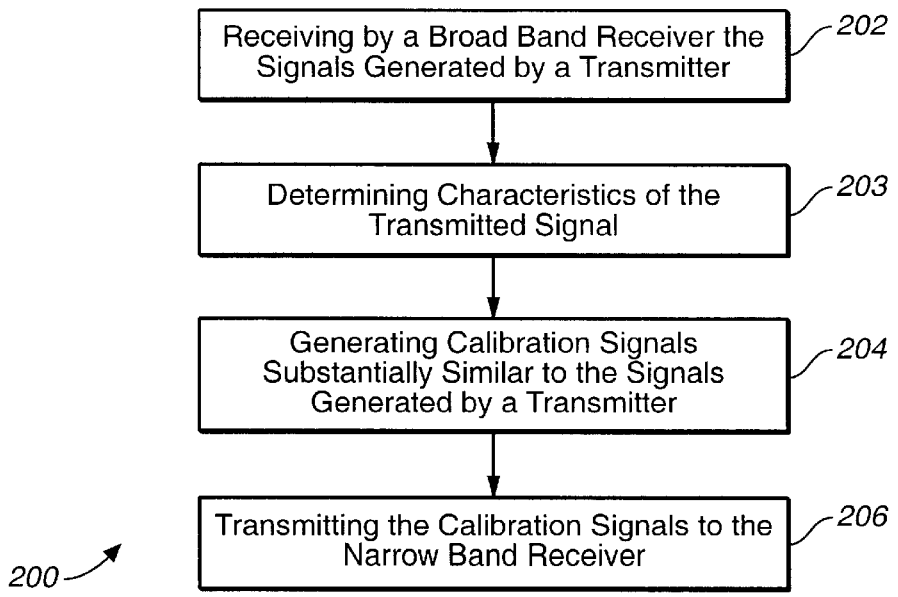
FIG._7
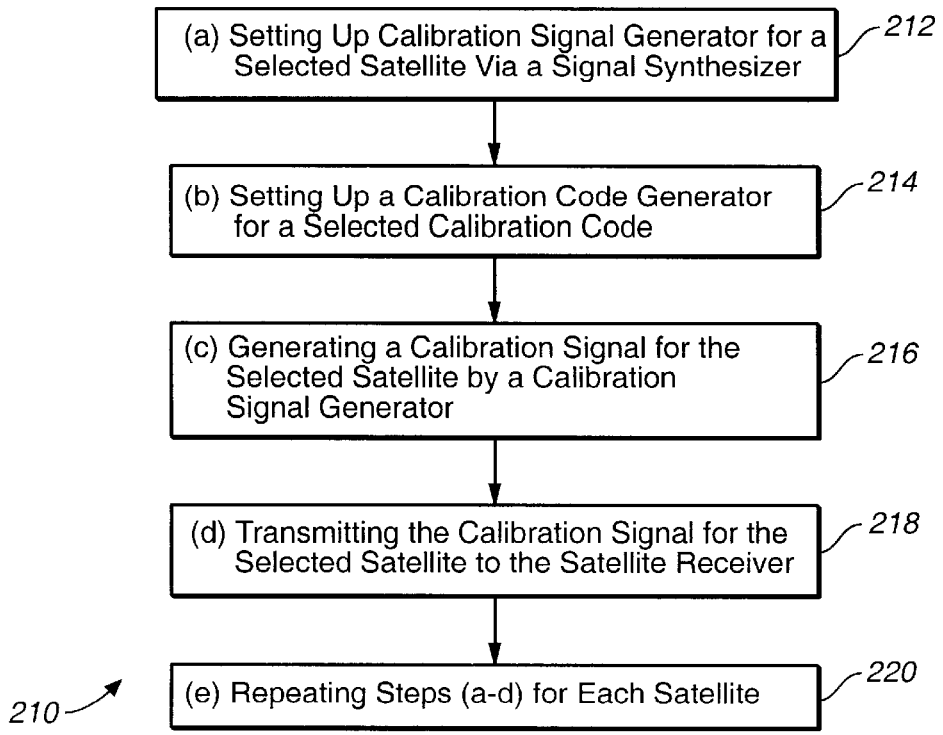
FIG._8

CODE GROUP DELAY CALIBRATION USING ERROR FREE REAL TIME CALIBRATION SIGNAL

This is the continuation of the U.S. patent application Ser. No. 08/943,552, filed on Oct. 03, 1997, and entitled "CALIBRATION FOR CODE GROUP DELAY ERRORS IN RECEIVERS", now abandoned.

FIELD OF THE INVENTION

The current invention is in the field of the calibration systems, and more specifically, in the field of code group delay calibration systems.

DESCRIPTION OF THE BACKGROUND ART

In the available art related to calibration systems, one kind of errors (that should be calibrated for) is caused by code group delay.

Indeed, code phase (also known as pseudo-range) measurements are now commonly processed successfully in GPS receivers to provide high accuracy position, velocity and time measurements, e. g. in differential and surveying applications. Numerous error sources in these measurements have been revealed and techniques have been developed to minimize or completely eliminate these errors. The U.S. Pat. No. 5,526,291, issued to Lennen, discloses how to solve the error in code and carrier phase caused by different receiver designs reacting differently to the same satellite signal because the different receiver types use different filtering, amplification and other components. Lennen et al. in the U.S. Pat. No. 5,515,057, describes how errors in the code and carrier phase measurement caused by electrical asymmetries in the antenna element could be solved.

One important kind of the code phase error is caused by the group delay characteristics within a GPS/GLONASS receiver. The group delay code phase errors caused by variations in the group delay across the received bandwidth are due to the specific characteristics of filters, amplifiers and other active components in a GPS/GLONASS receiver design. For instance, it is desirable for a GPS/GLONASS receiver to include the specific filter and amplifier components that would allow for the substantial filtering of out of band signals to prevent possible jamming. The code phase errors caused by the group delay characteristics within a satellite receiver are more pronounced in a GLONASS receiver than in a GPS receiver.

The technique that would allow the satellite receiver to maintain the active components with the specific desirable characteristics (like antijamming capabilities) while allowing the group delay code phase errors to be removed as an error source from the pseudo range measurements was disclosed by Gary Lennen in the U.S. Pat. No. 5,949,372, entitled "Signal Injection for Calibration of Pseudo-Range Errors in Satellite Positioning System Receivers". The '372 patent is specifically referred to in the present patent application and is incorporated herein in its entirety.

However, the Calibration Signal Generator disclosed in the '372 patent is an independently important circuit. Indeed, the Calibration Signal Generator can be used in a number of different applications, where there is a need to remove the delay group errors caused by the propagation of the received signal within the Narrow Band Receiver circuit.

SUMMARY OF THE INVENTION

To address the shortcomings of the available art, the present invention provides a method and a system for removing the delay group errors caused by propagation of the received signal within a Narrow Band Receiver circuit.

One aspect of the present invention is directed to an apparatus for calibrating in real time a Narrow Band Receiver for a code group delay in signals generated by a Narrow Band Transmitter.

In one embodiment of the present invention, the apparatus comprises: a Broad Band Receiver configured to receive signals generated by the Narrow Band Transmitter; and a Calibration Signal Generator circuit connected to the Broad band Receiver. The Calibration Signal Generator is configured to generate a calibration signal that is substantially free from the code group delay errors and intermodulation errors, and that is substantially similar to the signals generated by the Narrow Band Transmitter. The Calibration Signal Generator circuit is linked to the Narrow Band Receiver in order to transmit to the Narrow Band Receiver the calibration signal that is used to calibrate in real time the Narrow Band Receiver for the code group delay in signals generated by the Narrow Band Transmitter. In alternative embodiment, the Transmitter comprises a satellite Transmitter, the Narrow Band Receiver comprises a satellite Narrow Band Receiver including a Receiver Antenna, and the Calibration Signal Generator is configured to generate the calibration signal in order to calibrate the satellite signals for errors caused by variations in the group delay of the satellite signals across the received bandwidth in the satellite Narrow Band Receiver.

In one embodiment, the Narrow Band Satellite Receiver receives the satellite signals from the GPS system including a plurality of GPS satellites and from the GLONASS system including a plurality of GLONASS satellites, and wherein the GPS system generates $L1_{GPS}$ and $L2_{GPS}$ signals, wherein the GLONASS system generates $L1_{GLONASS}$ and $L2_{GLONASS}$ signals.

In one embodiment, the Calibration circuit further includes: a Calibration Signal Generator circuit configured to generate the calibration signal; and a Directional Coupler circuit connected to the Calibration Signal Generator circuit in order to receive the calibration signal and connected to the Narrow Band Satellite Receiver circuit in order to receive the satellite signals. The Directional Coupler is configured to combine the satellite signals with the calibration signal in order to generate a combined signal and in order to inject the combined signal into the Narrow Band Satellite Receiver circuit.

In one embodiment, the Calibration circuit further includes the Calibration Signal Generator circuit further comprising: a Calibration Signal Synthesizer configured to generate a code clock signal $C_{clk\_GLONASS}$, a code clock signal $C_{clk\_GPS}$, a local oscillator signal $LO_{L1\_GLONASS}$, a local oscillator signal $LO_{L2\_GLONASS}$, a local oscillator signal $LO_{L1\_GPS}$, and a local oscillator signal $LO_{L2\_GPS}$. The code clock signal $C_{clk\_GLONASS}$, the code clock signal $C_{clk\_GPS}$, the local oscillator signal $LO_{L1\_GLONASS}$, the local oscillator signal $LO_{L2\_GLONASS}$, the local oscillator signal $LO_{L1\_GPS}$, and the local oscillator signal $LO_{L2\_GPS}$ are locked to a single calibration clock frequency signal.

In one embodiment, the Calibration circuit further includes a Calibration Code Generator configured to generate a local code $C_{GLONASS}$ and a local code $C_{GPS}$; a Mixer configured to frequency translate the local code $C_{GLONASS}$ signal using the $LO_{L1\_GLONASS}$ signal into an L1_GLONASS signal, the local code $C_{GLONASS}$ signal using the $LO_{L2\_GLONASS}$ signal into an L2_GLONASS signal, the local code $C_{GPS}$ signal using the $LO_{L1\_GPS}$ signal into an L1_GPS signal, and the local code $C_{GPS}$ signal using the $LO_{L2\_GPS}$ signal into an L2_GPS signal; an RF Switch block configured to pass the L1_GLONASS signal, the L2_GLONASS signal, the L1_GPS signal, or the L2_GPS; and an Attenuator block configured to generate a calibration signal $C_{RF\_GLONASS\_L1}$, a calibration signal $C_{RF\_GLONASS\_L2}$, a calibration signal $C_{RF\_GPS\_L1}$, or a calibration signal $C_{RF\_GPS\_L2}$.

Another aspect of the present invention is directed to a method of generating a calibration signal for calibrating in real time a Narrow Band Receiver for code group delay in a signal generated by a Narrow Band Transmitter. In one embodiment, the method comprises the following steps: determining characteristics of the signal generated by the Narrow Band Transmitter; generating the calibration signal substantially similar to the signal generated by the Transmitter using a Calibration Signal Generator circuit; and transmitting the calibration signal to the Narrow Band Receiver in order to calibrate the Narrow Band Receiver for errors caused by variations in the code group delay signals across the received bandwidth.

The present invention also includes a method of generating a calibration signal for calibrating in real time a satellite Receiver for pseudo-range errors caused by variations in the code group delay of the received satellite signals across the received bandwidth. The satellite signals are emanating from a plurality of N satellite-vehicles, wherein N is an integer. In one embodiment, the method comprises the following steps: (a) determining the characteristics of a satellite signal generated by a satellite $SV_i$; (b) generating the calibration signal by the Calibration Signal Generator, wherein the calibration signal is substantially similar to the satellite signal generated by the satellite $SV_i$, and wherein the calibration signal is substantially free form the code group delay errors and intermodulation errors; (c) transmitting the calibration signal to the satellite Receiver in order to calibrate in real time the satellite Receiver for the pseudo-range errors caused by variations in the code group delay of a received satellite signal across the received bandwidth; wherein the satellite signal is emanating from the satellite $SV_i$; and (d) repeating the steps (a–c) for each the "i" satellite-vehicle $SV_i$, i is less or equal to N.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1 depicts an apparatus for calibrating a Narrow Band Receiver for the signals emanating from a Narrow Band Transmitter.

FIG. 2 shows a first preferred embodiment of an apparatus for calibrating a Narrow Band Receiver for the satellite signals emanating from at least one satellite system.

FIG. 3 illustrates a second preferred embodiment of an apparatus for calibrating a Narrow Band Receiver for the satellite signals emanating from at least one satellite system.

FIG. 4 depicts the Calibration Signal Generator.

FIG. 5 illustrates the Calibration Code Generator block.

FIG. 6 shows a spectrum analyzer plot of signal $C_{GLONASS}$ of FIG. 5 for $C_{clk\_GLONASS}$ and GLONASS C/A code selected.

FIG. 7 depicts the flow chart of a Narrow Band Receiver calibration process.

FIG. 8 illustrates the flow chart of a satellite Narrow Band Receiver calibration process.

DETAILED DESCRIPTION OF THE PREFERRED AND ALTERNATIVE EMBODIMENTS

The group delay is a composite effect caused by a signal bandwidth's interaction with the Receiver bandwidth. A discussion of group and phase delay effects in circuit design can be found in "Network Analysis and Synthesis", by Franklin F. Kuo, second edition, published by Wiley International, 1962. Essentially, any bandlimiting component has a non-linear group and phase delay profile with frequency.

Phase delay refers to the delay caused by a signal traversing a Receiver components at a single frequency. If the phase delay is not constant over the frequency range of interest, one has what is known as group delay distortion. To visualize group delay distortion more clearly, one may recall from Fourier analysis that code signal is made up of different carrier frequency components. An ideal transmission system should delay each frequency components equally. In the real world, the carrier frequency components of the code signal are delayed by different amounts, and the reconstruction of the output signal from its Fourier components would produce a signal of different shape as the input. The group delay is sometimes called "envelope delay".

It is well known (see the reference Kuo referred to above), how to relate the envelope delay to the poles and zeros of a transfer function for any electrical circuit. The shapes of the delay versus frequency characteristic are the same for all poles and zeros. The zeros contribute "negative" delay, wherein the poles, "positive" delay. Most physical systems contain both poles and zeros in their transfer functions and the location of these poles and zeros alter with temperature and components tolerance variation. Hence, in a complex electrical circuit (as the Receiver) the group delay variations can be extremely difficult to determine theoretically in advance. Therefore, the practical way to the minimization of the group delay distortion of the received signal leads to the Broad Band Receiver design. On the other hand, the Narrow Band Receiver design is useful in all applications wherein the antijamming protection of the received signals is essential.

The present invention allows one to utilize the Narrow Band Receiver, wherein the group delay errors can be measured and offset by using the special calibration signals generated by the Calibration circuit.

FIG. 1 depicts an apparatus (10) of the present invention used for generating the calibration signals and transmitting the calibration signals to the Narrow Band Receiver (14). In one embodiment, the apparatus (10) comprises a Calibration circuit (34) comprising a Calibration Signal Generator circuit (28) configured to generate a calibration signal substantially similar to the signals generated by the Transmitter and substantially free from the group delay errors and any other errors, including the intermodulation errors. In this embodiment, the characteristics of the signals generated by the Transmitter are known or can be determined in advance.

In an alternative embodiment of the present invention, the apparatus (10) comprises additionally a Broad Band Receiver (24) configured to receive the signals generated by a Transmitter (12) in order to determine the characteristics of the transmitted signal. In this embodiment, the Calibration Signal Generator (28) should be able to generate the calibration signal substantially similar to the transmitted signal (but free for the group delay errors or any other errors) by using the characteristics of the transmitted signal determined by the Broad Band Receiver circuit (24).

In one embodiment, in order to generate the signal substantially similar to the signals transmitted by the Transmitter (12) but free for the group delay errors the Calibration circuit (34) employs a Broad Band Receiver (24), a Calibration Antenna (22) and a first Communication Link (28). The Calibration Antenna is configured to receive the signals emanating from the Transmitter utilizing the first Communication Link. The Broad Band Receiver should have the bandwidth sufficiently broad so that all frequency components of the signals transmitted by the Transmitter (12) are delayed by the same amounts, and the reconstruction of the received signal from its Fourier components would produce a signal of the same shape as the transmitted signal.

The first Communication Link can include a variety of different embodiments: (1) a radiowave frequency band; (2) an infrared frequency band; (3) a microwave frequency band; (4) the ISM (industrial scientific medical) unlicensed operation band, wherein the ISM band range is selected from a class of frequency range consisting of 900 MHz, 2.4 GHz, and 5.8 GHz, and wherein the user can own the both ends of the ISM communication system; (5) a real time circuit switched communication link; (6) a 1.8 GHz band, wherein the 1.8 GHz band supports the personal communications services (PCS); (7) a Low Earth Orbiting Satellites (LEOS), wherein the LEOS is used to store and to forward digital packet data; (8) a Link selected from a class of radiowave communication means consisting of a cellular telephone communication means, paging signal receiving means, a wireless messaging services, a wireless application services, a wireless WAN/LAN station, and an Earth-satellite-Earth communication module that uses at least one satellite to relay a radiowave signal; (9) an Advanced Mobile Phone System (AMPS) including a modem, and wherein the modem is selected from a class consisting of a DSP (digital signal processor) modem, and a cellular digital packet data (CDPD) modem; (10) a digital cellular telephone communication means, and wherein the digital cellular telephone communication means includes a means of modulation of digital data over a radiolink selected from a class consisting of a time division multiple access (TDMA) system, and a code division multiple access (CDMA) system; and (11) an electrical circuit.

In one embodiment, having generated the calibration signal substantially similar to the transmitted signal but free form the group delay errors, the Calibration circuit (34) can employ the same Calibration Antenna circuit (22) and a second Communication Link (20) to transmit the calibration signal to the narrow Band Receiver (14). The second Communication Link can include all the embodiments disclosed above in connection with the description of the first Communication Link.

Thus, the Narrow Band Receiver (14) receives in real time the transmitted signal including the group delay errors and the calibration signal free from the group delay errors (and any other errors). Therefore, the Narrow Band Receiver can measure in real time the group delay errors for any given temperature, components aging and components tolerance variation. Having measured the group delay errors for any given temperature, components aging and components tolerance variation in real time, the Narrow Band Receiver (14) can offset in real time the signal received from the Transmitter (12) for the group delay errors for any given temperature, components aging and components tolerance variation.

The flow chart (200) shown in FIG. 7 describes the method of generating a calibration signal (that is free from code group delay errors and any other errors) that can be used for calibrating in real time the signals generated by the Transmitter (12 of FIG. 1) and received by he Narrow Band Receiver (14 of FIG. 1).

In one embodiment, the first step (202) is to receive by the Broad Band Receiver (24 of FIG. 1) the signals generated by the Transmitter. The next step (203) is to determine the characteristics of the transmitted signal, and (step 204) to generate the calibration signals substantially similar to the signals generated by the Transmitter using the Calibration Signal Generator circuit (28 of FIG. 1). Finally (step 206), the calibration signals are transmitted to the Narrow Band Receiver (14 of FIG. 1) in order to calibrate in real time the signals emanating from the Transmitter for errors caused by variations in the group delay signals across the received bandwidth.

In another embodiment, the first step (203) is to determine apriori the characteristics of the signals generated by the Transmitter. The following steps are the same as in the above-mentioned embodiment—to generate the calibration signals substantially similar to the signals generated by the Transmitter using the Calibration Signal Generator circuit (step 204) and (step 206) to transmit the calibration signal (that is free from code group delay errors) to the Narrow Band Receiver (14 of FIG. 1) in order to calibrate the signals emanating from the Transmitter for errors caused by variations in the group delay signals across the received bandwidth.

Referring still to FIG. 1, in one embodiment, the Transmitter (12 of FIG. 1) comprises a satellite Transmitter, the Narrow Band Receiver (14 of FIG. 1) comprises a satellite Narrow Band Receiver including a Receiver Antenna, and the Calibration Signal Generator (34 of FIG. 1) generates the calibration signals in order to calibrate the Narrow Band Receiver for errors caused by variations in the group delay of the satellite signals across the received bandwidth in the satellite Narrow Band Receiver.

In one embodiment, as shown in FIG. 2, the Transmitter (52) comprises at least one GLONASS satellite Transmitter and at least one GPS satellite Transmitter, the Narrow Band Receiver (58) comprises a GPS/GLONASS satellite Receiver including a GPS/GLONASS Receiver Antenna (54), and the Calibration circuit (75) comprises a Calibration Signal Generator (68).

In one embodiment, when only the GLONASS satellites are used for the navigation purposes, the Calibration Circuit (75) should be configured to generate the calibration signal (70) substantially similar to the GLONASS signals (but free from the group delay errors) in order to calibrate the GLONASS rf channel of the combined GPS/GLONASS Receiver for errors caused by variations in the group delay of the GLONASS satellite signals across the received bandwidth in the GPS/GLONASS combined satellite Receiver (58).

In an alternative embodiment, when only the GPS satellites are used for the navigation purposes, the Calibration Circuit (75) should be configured to generate the calibration signal (70) substantially similar to the GPS signals (but free from the group delay errors) in order to calibrate the GPS rf channel of the combined GPS/GLONASS Receiver for errors caused by variations in the group delay of the GPS satellite signals across the received bandwidth in the GPS/GLONASS combined satellite Receiver (58). In this particular situation, the group delay is benign unless very precise measurements are needed. (See, for instance, the U.S. Pat. No. 5,949,372 "Signal Injection for Calibration of Pseudo-Range Errors in Satellite Positioning System Receivers").

Yet, in one embodiment, both the GPS satellites and the GLONASS satellites are used for the navigation purposes. In this embodiment, there is a receiver dependent group delay because the GLONASS Receiver rf channel is different from the GPS Receiver rf channel. In this embodiment, the GPS Receiver rf channel of the GPS/GLONASS Receiver receives the GPS satellite signals, the GLONASS Receiver rf channel of the GPS/GLONASS Receiver receives the GLONASS satellite signals. The Calibration Circuit (75) should be able to generate two different calibration signals—the GPS calibration signal substantially similar to the GPS signals in order to calibrate the GPS rf channel of the combined GPS/GLONASS Receiver for GPS group delay errors, and the GLONASS calibration signal substantially similar to the GLONASS signals in order to calibrate the GLONASS rf channel of the combined GPS/GLONASS Receiver for GLONASS group delay errors. This allows the Receiver's group delay effects to be removed from the combine GPS/GLONASS measurements.

In one embodiment, the Calibration circuit (75) additionally includes a Directional Coupler (66). In this embodiment, the Directional Coupler (66) sends a combined signal (64) comprising the received satellite signal (55) and the calibration signal (70) to the GPS/GLONASS Receiver (58).

The GPS Receiver design is disclosed by Charles Trimble in the U.S. Pat. No. 4,754,465 and the GLONASS Receiver design is disclosed by Gary Lennen in the U.S. Pat. No. 5,486,834. The combined GPS/GLONASS satellite positioning system Receiver was disclosed by Gary Lennen in the U.S. Pat. No. 5,923,287.

In one embodiment, as shown in FIG. 3, the Calibration Circuit (115) comprises a Calibration Signal Generator (122), a Power Combiner (118) and a Calibration Antenna (114). In this embodiment, the Calibration Antenna (114) transmits the calibration signal using the satellite carrier frequency band (116) to the GPS/GLONASS Receiver Antenna (106). The Calibration Antenna (114) should have the property of being relatively invariant in its time delay characteristics and should not substantially interfere electrically with the GPS/GLONASS Receiver Antenna (106).

The satellite signal is received by the Antenna block (54). An antenna of the type described in the U.S. Pat. No. 5,515,057 issued to Lennen et al "GPS Receiver With N-Point Symmetrical Feed Double-Frequency Patch Antenna" is appropriate if its characteristics are altered in such a way as to enable the antenna to pass the L1 GPS/GLONASS BAND and L2 GPS/GLONASS BAND.(See, for instance, the U.S. Pat. No. 5,949,372 "Signal Injection for Calibration of Pseudo-Range Errors in Satellite Positioning System Receivers"). Such an antenna has stable phase and group delay characteristics suitable for high accuracy applications utilizing GPS and GLONASS satellites.

All embodiments of the Calibration circuit (115 of FIG. 3, 68 of FIG. 2 and 75 of FIG. 2) employ the Calibration Signal Generator (150) of FIG. 4. As shown in FIG. 4, the Calibration Signal Generator (150) further comprises a Calibration Signal Synthesizer (154) configured to generate a code clock signal $C_{clk\_GLONASS}$ (156), a code clock signal $C_{clk\_GPS}$ (not shown), a local oscillator signal $LO_{L1\_GLONASS}$ (164), a local oscillator signal $LO_{L2\_GLONASS}$ (not shown), a local oscillator signal $LO_{L1\_GPS}$ (not shown) and a local oscillator signal $LO_{L2\_GPS}$ (not shown).

In one embodiment, the code clock signal $C_{clk\_GLONASS}$, the code clock signal $C_{clk\_GPS}$, the local oscillator signal $LO_{L1\_GLONASS}$, the local oscillator signal $LO_{L2\_GLONASS}$, the local oscillator signal $LO_{L1\_GPS}$, and the local oscillator signal $LO_{L2\_GPS}$ are locked to a single calibration clock frequency signal $OSC_{CAL}$ (152) generated by the GPS/GLONASS Receiver. This significantly simplifies the acquisition and measurement of the calibration signal by the Narrow Band Receiver.

In an alternative embodiment, the code clock signal $C_{clk\_GLONASS}$, the code clock signal $C_{clk\_GPS}$, the local oscillator signal $LO_{L1\_GLONASS}$, the local oscillator signal $LO_{L2\_GLONASS}$, the local oscillator signal $LO_{L1\_GPS}$, and the local oscillator signal $LO_{L2\_GPS}$ are locked to a single calibration clock frequency signal not related to the clock generated by the GPS/GLONASS Receiver.

In one embodiment, the Calibration Signal Generator (15) of FIG. 4 further includes a Calibration Code Generator (158) shown in FIG. 5. The Calibration Code Generator is configured to generate a local code $L_C$ (160) which can comprise a local code $C_{GLONASS}$ (196), a local code $C_{GPS}$ (192), or a local code H (194).

In one embodiment, the input code clock signal $C_{clk\_GLONASS}$ (156) is at a rate of 5.11 MHz for GLONASS. In an alternative embodiment, the input code clock signal $C_{clk\_GPS}$ (156) is at a rate of 10.23 MHz for GPS. As was stated above, it is very important that the calibration signal have the amplitude/frequency signal structure substantially similar to that of the actual satellite transmissions. To that end the Calibration Code Generator clock is chosen to be close to the satellite code clocks. The input code clock signal $C_{clk\_GLONASS}$ (256) is input to a Divide-by-10 block (182), thus allowing generation of two clocks, one at 5.11 MHz and one at 0.511 MHz, for P-code and C/A code use respectively. The output signal (185) of the Multiplexer 1 block (184) is the clock signal which drives GPS (C/A or P) Code Generator block (186), H Code Generator block (188), and GLONASS (C/A or P) Code Generator block (190) that produce standard satellite codes described in references ICD-GPS-200, GLONASS ICD and "GLONASS P-code - Determination and Initial Results", by Gary Lennen. For the complete reference, please see the U.S. Pat. No. 5,923,287 entitled "Combined GPS/GLONASS Satellite Positioning System Receiver".

The Multiplexer 2 (198) selects a single local code $L_C$ (160) from GPS C/A, GPS P(Y), GLONASS C/A, GLONASS C/A, or H locally generated codes. In one embodiment, FIG. 6 shows a spectrum analyzer plot of signal $C_{GLONASS}$ (160) for $C_{clk\_GLONASS}$ and GLONASS C/A Code Generator (190) selected. Signal $C_{GLONASS}$ (160) generated by the Calibration Code Generator (158) of FIG. 5 has the same frequency/amplitude characteristics as the GLONASS satellite signal.

Referring still to FIG. 4, the Mixer block (162) frequency translates the $C_{GLONASS}$ signal (160) to the GLONASS L1 frequency band. Thus, the spectrum of FIG. 13 is centered in the GLONASS L1 band. The Calibration Signal Synthesizer block (154) consists of phase-locked loop circuits well known in the art. The signal $C_{GLONASS}$ (160) is used to modulate the carrier signals generated by the Signal Synthesizer block (154). Similarly, the Mixer (162) of FIG. 4 frequency translates the local code $C_{GLONASS}$ signal using the $LO_{L2\_GLONASS}$ signal into an L2__GLONASS signal, the local code $C_{GPS}$ signal using the $LO_{L1\_GPS}$ signal into an L1__GPS signal, or the local code $C_{GPS}$ signal using the $LO_{L2\_GPS}$ signal into an L2__GPS signal (166).

An RF Switch block (168) is configured to pass the L1_GLONASS signal, the L2_GLONASS signal, the L1_GPS signal, or the L2_GPS. Finally, an Attenuator block (172) generates one of the following calibration signals (174): a calibration signal $C_{RF\_GLONASS\_L1}$ for L1 GLONASS signal, a calibration signal $C_{RF\_GLONASS\_L2}$ for L2 GLONASS signal, a calibration signal $C_{RF\_GPS\_L1}$ for L1 GPS signal, or a calibration signal $C_{RF\_GPS\_L2}$ for L2 GPS signal.

An important and critical requirement (in terms of accuracy) for the analogue components used in the design of the Calibration Signal Generator (150) of FIG. 4 is that the analogue components should have constant group delay characteristics across the frequency bands of interest (that is primarily across the GLONASS L1 and GLONASS L2 bands). This requirement is possible to satisfy in the Calibration Signal Generator because one is not concerned with rejecting out of band interference. Indeed, the out of band filtering in the normal satellite receiving path will perform out of band rejection on the Calibration Signal Generator output. Hence, one is free to make the Mixer block (162) of FIG. 4, the RF Switch block (168) of FIG. 4, the Attenuator block (172) of FIG. 4, the Directional Coupler block (66) of FIG. 2, the Power Combiner block (118) of FIG. 3, and Calibration Antenna (114) of FIG. 3 resistant to variation in time delay. Thus the Calibration Signal Generator can be designed using the high accuracy components with Wide bandwidth. The ability of the calibration Signal Generator to resist time delay variation across the bandwidth of interest relative to the Narrow Band Receiver's normal path time delay variation will dictate the degree of improvement in the ability of the apparatuses of FIGS. 2 and 3 to compensate for the group delay.

An important characteristic of the present invention is that, for instance, the generated code $C_{GLONASS}$ (160) of FIG. 5 is identical for all calibrated satellite channels. Since the generated code $C_{GLONASS}$ (160) is being received and measured as pseudo-range, the generated code $C_{GLONASS}$ (160) is identical for all carrier frequencies as long as the output of the Mixer (162) and subsequent Calibration Signal Generator blocks are invariant in group delay across the GLONASS L1 (or GLONASS L2) band. As a general rule, a wide bandwidth components causes that components to have small variation in group delay within its bandwidth. Thus, the Mixer block (162) and subsequent blocks of the Calibration Signal Generator can be chosen to have exceptionally wide bandwidth around the GLONASS L1 (GLONASS L2) band. If the Calibration Signal Generator had significant variation in group delay across the GLONASS L1 band, the present invention technique would not be able to separate this effect from the Receiver's group delay profile one is trying to measure. Therefore, for the GLONASS L1 band centered around 1.6 GHz, one can use the commonly available Mixers, RF Switches, Attenuators, and Directional Couplers with bandwidth in the range 500 MHz to 4 GHz.

To provide the antijamming protection, one can use in the Calibration circuit a code other than one that is transmitted by the real satellite. FIG. 5 shows the generators of three different codes. If one would like to calibrate for GLONASS L1 C/A code (C/A and P code require separate calibration because they have significantly different bandwidth and signal structure) then using a GLONASS C/A code for real-time calibration may interfere with real satellite reception. In this particular case, the suitable alternative would be to use a GPS C/A or GPS P code clocked as the GLONASS C/A code rate of 0.511 MHz. This minimizes cross-correlation between calibration and real satellite signals but maintains substantially similar amplitude/frequency signal structure characteristics because they are clocked at the GLONASS C/A code rate. This use of GPS codes for GLONASS calibration (and visa versa) is convenient because Receivers are typically capable of receiving these codes. FIG. 5 shows also the H Code Generator (188) which represents yet another code chosen for its minimal cross-correlation properties with the GLONASS L1 C/A code. The Receiver should be capable of generating a local replica of the H code. Possible examples of H code include Maximal Length Shift Register sequences and other Gold Code Sequences.

For the detailed description of different antijamming options please see the U.S. Pat. No. 5,949,372 "Signal Injection for Calibration of Pseudo-Range Errors in Satellite Positioning System Receivers" that is specifically referred to in the present patent application and is incorporated herein in its entirety.

The present invention also includes a method of generating a code group delay error free calibration signal that can be used for calibrating a satellite Receiver for group delay of satellite signals emanating from a plurality of N satellite-vehicles, N being an integer.

In general, the method can be practiced in the following way. After determining the characteristics of a satellite signal generated by a satellite $SV_i$, one can employ a Calibration Signal Generator to generate a calibration signal substantially similar to the satellite signal generated by the satellite $SV_i$. The generated calibration signal can be transmitted to the satellite Receiver in order to calibrate the satellite Receiver for the group delay errors in the satellite signal emanating from the selected satellite $SV_i$. The above-mentioned steps are preferably repeated for all satellites used to determine the navigational information.

In particular, FIG. 8 shows a flow chart (210) depicting a method of generating a calibration signal employing the apparatus (75) of FIG. 2. The generated calibration signal can be used for calibrating the Narrow Band satellite Receiver for the group delay errors in the satellite signals emanating from a plurality of N satellite-vehicles, N being an integer, and received by a Narrow Band satellite Receiver. The first step (212) is to set up a Calibration Signal Generator for a selected satellite $SV_i$ via a Signal Synthesizer. The next step (214) is to set up a Calibration Code Generator for a selected calibration code. After generating a calibration signal for the selected satellite $SV_i$ (step 216), the calibration signal for the satellite $SV_i$ is transmitted to the Narrow Band satellite Receiver (step 218). Finally (step 220), all above-mentioned steps are preferably repeated for each "i" satellite-vehicle $SV_i$, wherein "i" is less or equal to N, and wherein N satellites are needed to collect the navigational information.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. An apparatus for calibrating in real time a Narrow Band Receiver for a code group delay in signals generated by a Narrow Band Transmitter, said apparatus comprising:
   a Broad Band Receiver configured to receive the signals generated by said Narrow Band Transmitter; and
   a Calibration Signal Generator circuit connected to said Broad band Receiver;

wherein said Calibration Signal Generator is configured to generate a calibration signal that is substantially free from the code group delay errors and intermodulation errors, and that is substantially similar to the signals generated by said Narrow Band Transmitter;

and wherein said Calibration Signal Generator circuit is linked to said Narrow Band Receiver in order to transmit to said Narrow Band Receiver said calibration signal;

and wherein said calibration signal is used to calibrate in real time said Narrow Band Receiver for said code group delay in signals generated by said Narrow Band Transmitter.

2. The apparatus of claim 1 further comprising:

a Calibration Antenna connected to said Broad Band Receiver; and a first Communication Link;

wherein said Calibration Antenna is configured to receive the signals emanating from said Transmitter utilizing said first Communication Link.

3. The apparatus of claim 2 further comprising:

a second Communication Link;

wherein said Calibration Antenna is configured to transmit the calibration signals generated by said Calibration Signal Generator to said Narrow Band Receiver utilizing said second Communication Link in order to calibrate the signals emanating from said Transmitter and received by said Narrow Band Receiver for errors caused by variations in the Transmitter group delay across the received bandwidth.

4. The apparatus of claim 3, wherein said Transmitter comprises a satellite Transmitter, wherein said Narrow Band Receiver comprises a satellite Narrow Band Receiver including a Receiver Antenna, and wherein said Calibration Signal Generator is configured to generate said calibration signal in order to calibrate said satellite signals for errors caused by variations in the group delay of said satellite signals across the received bandwidth in said satellite Narrow Band Receiver.

5. The system of claim 2, wherein said first Communication Link includes a radiowave frequency band.

6. The system of claim 2, wherein said first Communication Link includes an infrared frequency band.

7. The system of claim 2, wherein said first Communication Link includes a microwave frequency band.

8. The system of claim 2, wherein said first Communication Link includes the ISM (industrial scientific medical) unlicensed operation band, and wherein the ISM band range is selected from a class of frequency range consisting of 900 MHz, 2.4 GHz, and 5.8 GHz; and wherein the user can own the both ends of the ISM communication system.

9. The system of claim 2, wherein said first Communication Link includes a real time circuit switched communication link.

10. The system of claim 2, wherein said first Communication Link includes a 1.8 GHz band, wherein said 1.8 GHz band supports the personal communications services (PCS).

11. The system of claim 2, wherein said first Communication Link includes a Low Earth Orbiting Satellites (LEOS), wherein said LEOS is used to store and to forward digital packet data.

12. The system of claim 2, wherein said first Communication Link is selected from a class of radiowave communication means consisting of a cellular telephone communication means, paging signal receiving means, a wireless messaging services, a wireless application services, a wireless WAN/LAN station, and an Earth-satellite-Earth communication module that uses at least one satellite to relay a radiowave signal.

13. The system of claim 2, wherein said first Communication Link includes an Advanced Mobile Phone System (AMPS) including a modem, and wherein said modem is selected from a class consisting of a DSP (digital signal processor) modem, and a cellular digital packet data (CDPD) modem.

14. The system of claim 2, wherein said first Communication Link includes a digital cellular telephone communication means, and wherein said digital cellular telephone communication means includes a means of modulation of digital data over a radiolink selected from a class consisting of a time division multiple access (TDMA) system, and a code division multiple access (CDMA) system.

15. The system of claim 2, wherein said first Communication Link includes an electrical circuit.

16. The system of claim 3, wherein said second Communication Link includes a radiowave frequency band.

17. The system of claim 3, wherein said second Communication Link includes an infrared frequency band.

18. The system of claim 3, wherein said second Communication Link includes a microwave frequency band.

19. The system of claim 3, wherein said second Communication Link includes the ISM (industrial scientific medical) unlicensed operation band, and wherein the ISM band range is selected from a class of frequency range consisting of 900 MHz, 2.4 GHz, and 5.8 GHz; and wherein the user can own the both ends of the ISM communication system.

20. The system of claim 3, wherein said second Communication Link includes a real time circuit switched communication link.

21. The system of claim 3, wherein said second Communication Link includes a 1.8 GHz band, wherein said 1.8 GHz band supports the personal communications services (PCS).

22. The system of claim 3, wherein said second Communication Link includes a Low Earth Orbiting Satellites (LEOS), wherein said LEOS is used to store and to forward digital packet data.

23. The system of claim 3, wherein said second Communication Link is selected from a class of radiowave communication means consisting of a cellular telephone communication means, paging signal receiving means, a wireless messaging services, a wireless application services, a wireless WAN/LAN station, and an Earth-satellite-Earth communication module that uses at least one satellite to relay a radiowave signal.

24. The system of claim 3, wherein said second Communication Link includes an Advanced Mobile Phone System (AMPS) including a modem, and wherein said modem is selected from a class consisting of a DSP (digital signal processor) modem, and a cellular digital packet data (CDPD) modem.

25. The system of claim 3, wherein said second Communication Link includes a digital cellular telephone communication means, and wherein said digital cellular telephone communication means includes a means of modulation of digital data over a radiolink selected from a class consisting of a time division multiple access (TDMA) system, and a code division multiple access (CDMA) system.

26. An apparatus for calibrating in real time a Narrow Band Receiver for a code group delay in signals generated by a Narrow Band Transmitter, said apparatus comprising:

a Calibration Signal Generator circuit configured to generate a calibration signal substantially similar to the signals generated by said Narrow Band Transmitter;

wherein said Calibration Signal Generator circuit is linked to said Narrow Band Receiver in order to transmit to said Narrow Band Receiver said calibration signal;

and wherein said calibration signal is used to calibrate in real time said Narrow Band Receiver for said code group delay in signals generated by said Narrow Band Transmitter;

and wherein said calibration signal is free from said code group delay errors and intermodulation errors.

27. The apparatus of claim 26 further comprising:

a Communication Link; and a Calibration Antenna configured to transmit the calibration signals generated by said Calibration Signal Generator to said Narrow Band Receiver utilizing said Communication Link in order to calibrate said Narrow Band Receiver for the group delay errors across the received bandwidth caused by the group delay variations of the signals emanating from said Transmitter.

28. An apparatus for calibrating in real time a Narrow Band Satellite Receiver for pseudo-range errors caused by variations in a code group delay of at least one received satellite signal across a received bandwidth; said apparatus comprising:

a Calibration circuit configured to generate a calibration signal substantially similar to said satellite signals;

wherein said Calibration circuit is linked to said Narrow Band satellite Receiver in order to transmit to said Narrow Band Satellite Receiver said calibration signal;

and wherein said calibration signal is used to calibrate in real time said Narrow Band Satellite Receiver for pseudo-range errors caused by variations in said code group delay of said at least one received satellite signal across said received bandwidth;

and wherein said calibration signal is free from said satellite code group delay errors and intermodulation errors.

29. The apparatus of claim 28, wherein said Narrow Band Satellite Receiver receives the satellite signals from the GPS system including a plurality of GPS satellites and from the GLONASS system including a plurality of GLONASS satellites, and wherein the GPS system generates $L1_{GPS}$ and $L2_{GPS}$ signals, wherein said GLONASS system generates $L1_{GLONASS}$ and $L2_{GLONASS}$ signals.

30. The apparatus of claim 28, wherein said Calibration circuit further includes:

a Calibration Signal Generator circuit configured to generate said calibration signal.

31. The apparatus of claim 28, wherein said Calibration circuit further includes:

a Calibration Signal Generator circuit configured to generate said calibration signal; and a Directional Coupler circuit connected to said Calibration Signal Generator circuit in order to receive said calibration signal and connected to said Narrow Band Satellite Receiver circuit in order to receive said satellite signals;

wherein said Directional Coupler is configured to combine said satellite signals with said calibration signal in order to generate a combined signal and in order to inject said combined signal into said Narrow Band Satellite Receiver circuit.

32. The apparatus of claim 28, wherein said Calibration circuit further includes:

a Calibration Signal Generator circuit configured to generate said calibration signal;

a Power Combiner circuit connected to said Calibration Signal Generator circuit; and a Calibration Antenna circuit connected to said Power Combiner Circuit;

wherein said Calibration Antenna is configured to transmit said calibration signal to said Receiver Antenna using a satellite carrier frequency band.

33. The apparatus of claim 28, wherein said Calibration circuit further includes said Calibration Signal Generator circuit further comprising:

a Calibration Signal Synthesizer configured to generate a code clock signal $C_{clk\_GLONASS}$, a code clock signal $C_{clk\_GPS}$, a local oscillator signal $LO_{L1\_GLONASS}$, a local oscillator signal $LO_{L2\_GLONASS}$, a local oscillator signal $LO_{L1\_GPS}$, and a local oscillator signal $LO_{L2\_GPS}$, wherein said code clock signal $C_{clk\_GLONASS}$, said code clock signal $C_{clk\_GPS}$, said local oscillator signal $LO_{L1\_GLONASS}$, said local oscillator signal $LO_{L2\_GLONASS}$, said local oscillator signal $LO_{L1\_GPS}$, and said local oscillator signal $LO_{L2\_GPS}$ are locked to a single calibration clock frequency signal;

a Calibration Code Generator connected to said Calibration Signal Synthesizer, wherein said Calibration Code Generator is configured to generate a local code $C_{GLONASS}$ and a local code $C_{GPS}$;

a Mixer connected to said Calibration Signal Synthesizer and connected to said Calibration Code Generator, wherein said Mixer is configured to frequency translate said local code $C_{GLONASS}$ signal using said $LO_{L1\_GLONASS}$ signal into an L1_GLONASS signal, said local code $C_{GLONASS}$ signal using said $LO_{L2\_GLONASS}$ signal into an L2_GLONASS signal, said local code $C_{GPS}$ signal using said $LO_{L1\_GPS}$ signal into an L1_GPS signal, and said local code $C_{GPS}$ signal using said $LO_{L2\_GPS}$ signal into an L2_GPS signal;

an RF Switch block coupled to said Mixer, wherein said RF Switch block is configured to pass said L1_GLONASS signal, said L2_GLONASS signal, said L1_GPS signal, or said L2_GPS; and an Attenuator block connected to said RF Switch block, wherein said Attenuator is configured to generate a calibration signal $C_{RF\_GLONASS\_L1}$, a calibration signal $C_{RF\_GLONASS\_L2}$, a calibration signal $C_{RF\_GPS\_L1}$, or a calibration signal $C_{RF\_GPS\_L2}$.

34. The apparatus of claim 33, wherein said Calibration Code Generator further comprises:

a Divide-by-10 block configured to divide said GLONASS calibration signal $C_{clk\_GLONASS}$, or said GPS calibration signal $C_{clk\_GPS}$ in order to generate a $C_{clk\_P\_GLONASS}$ clock signal, a $C_{clk\_C/A\_GLONASS}$ clock signal, a $C_{clk\_P\_GPS}$ clock signal, or a $C_{clk\_C/A\_GPS}$ clock signal;

a Multiplexer 1 connected to said Divide-by-10 block, wherein said Multiplexer 1 block is configured to select a $C_{clk\_P\_GLONASS}$ clock signal, a $C_{clk\_C/A\_GLONASS}$ clock signal, a $C_{clk\_P\_GPS}$ clock signal, or a $C_{clk\_C/A\_GPS}$ clock signal;

a GPS C/A code generator connected to said Multiplexer 1, wherein said GPS C/A code generator is configured to generate a GPS C/A code signal;

a GPS P(Y) code generator connected to said Multiplexer 1, wherein said GPS P(Y) code generator is configured to generate a GPS P(Y) code signal;

a GLONASS C/A code generator connected to said Multiplexer 1, wherein said GLONASS C/A code generator is configured to generate a GLONASS C/A code signal;

a GLONASS P code generator connected to said Multiplexer 1, wherein said GLONASS P code generator is configured to generate a GLONASS P code signal;

an H Code generator connected to said Multiplexer 1, wherein said H code generator is configured to generate an H code signal; and a Multiplexer 2 configured to select a single local code $L_c$ from said GPS C/A, said GPS P(Y), said GLONASS C/A, said GLONASS C/A, or said H locally generated codes.

35. A method of generating a calibration signal for calibrating in real time a Narrow Band Receiver for code group delay in a signal generated by a Narrow Band Transmitter, said method comprising the steps of:

determining characteristics of said signal generated by said Narrow Band Transmitter;

generating said calibration signal substantially similar to said signal generated by said Transmitter using a Calibration Signal Generator circuit; and transmitting said calibration signal to said Narrow Band Receiver in order to calibrate said Narrow Band Receiver for errors caused by variations in the code group delay signals across the received bandwidth.

36. A method of generating a calibration signal for calibrating in real time a Narrow Band Receiver for a code group delay in a signal generated by a Narrow Band Transmitter, said method comprising the steps of:

receiving by a Broad Band Receiver said signal generated by said Transmitter;

determining the characteristics of said signal generated by said Transmitter and received by said Broad Band Receiver;

generating said calibration signal substantially similar to said signal generated by said Transmitter using a Calibration Signal Generator circuit; and transmitting said calibration signals to said Narrow Band Receiver in order to calibrate said Narrow Band Receiver for errors caused by variations in the code group delay signals across the received bandwidth.

37. A method of generating a calibration signal for calibrating in real time a satellite Receiver for pseudo-range errors caused by variations in the code group delay of the received satellite signals across the received bandwidth; said satellite signals emanating from a plurality of N satellite-vehicles, N being an integer; said method comprising the steps of:

(a) determining the characteristics of a satellite signal generated by a satellite $SV_i$;

(b) generating said calibration signal by, said Calibration Signal Generator, wherein said calibration signal is substantially similar to said satellite signal generated by said satellite $SV_i$; and wherein said calibration signal is substantially free form said code group delay errors and intermodulation errors;

(c) transmitting said calibration signal to said satellite Receiver in order to calibrate in real time said satellite Receiver for said pseudo-range errors caused by variations in the code group delay of a received satellite signal across the received bandwidth; said satellite signal emanating from said satellite $SV_i$; and (d) repeating said steps (a–c) for each said "i" satellite-vehicle $SV_i$, i being less or equal to N.

* * * * *